Patented May 17, 1949

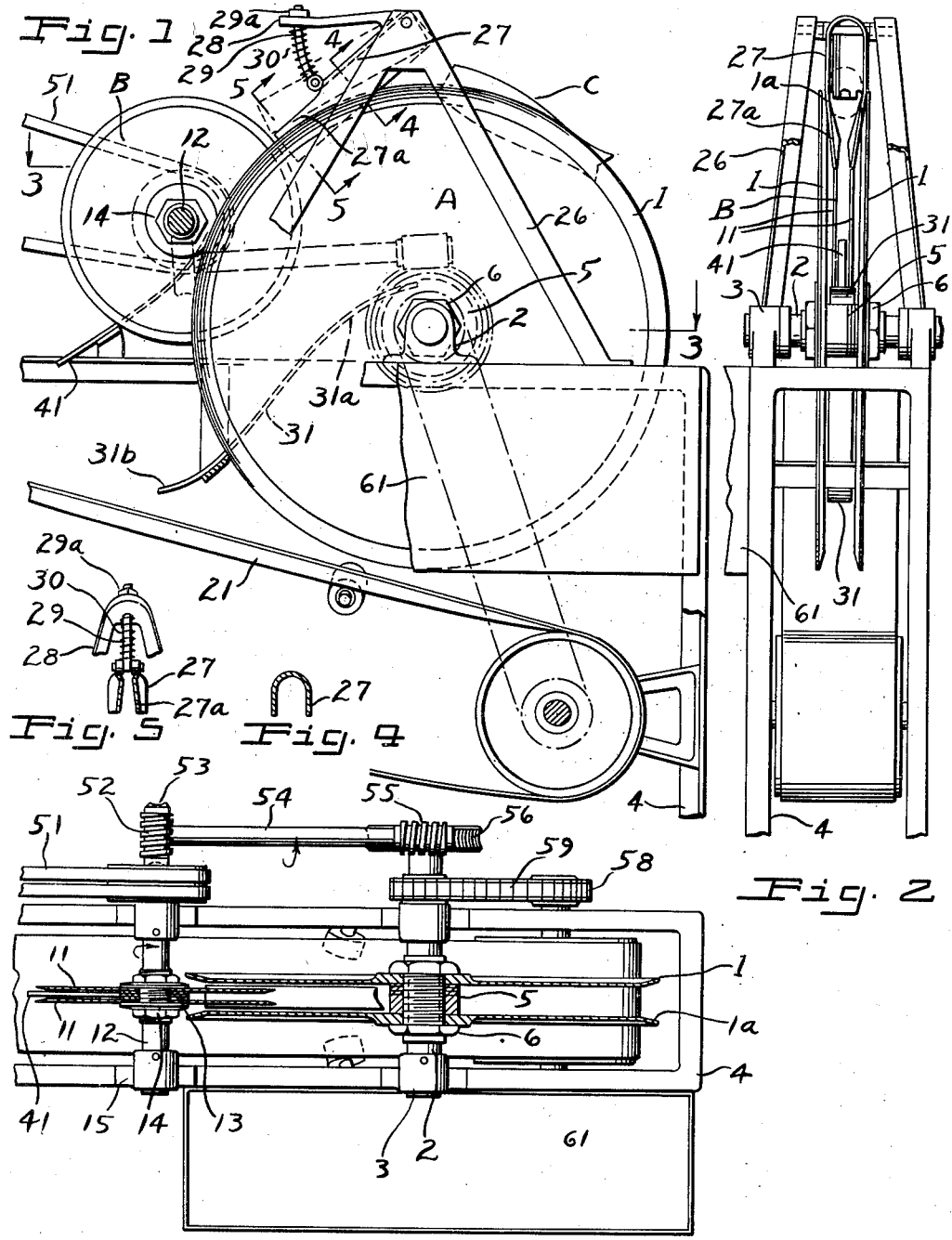

2,470,289

UNITED STATES PATENT OFFICE 2,470,289

FISH BACKBONE REMOVING MACHINE

Andrew L. Christiansen, Willowbrook, Calif.

Application November 8, 1943, Serial No. 509,342

5 Claims. (Cl. 17—4)

My present invention relates to a means for removing the backbones of fish.

One of the principal objects of this invention is to provide a machine of this class which will easily, quickly, and effectively remove the backbone of fish; a machine of this class in which the fish may be easily placed or fed for the purpose of the above operation, and a machine of this class in which the various severed portions of the fish are ejected and removed so that they may be easily separated.

Another important object of this invention is to provide a machine of this class whereby fish of different sizes, shapes, and descriptions, may be readily handled to remove the backbones therefrom.

An important object also of this invention is to provide a machine of this class in which the whole of the backbone is uniformly removed from the head to the tail ends.

A further important object of this invention is to provide novel means for gripping or holding fish from which the backbones are to be removed.

A still further important object of this invention is the provision of simple and efficient means in a machine of this class, whereby the tail portions of the fish are centralized in the conveyor, which carries the fish longitudinally, so that the tail portions thereof may be aligned with the head portions, to facilitate longitudinal cutting of the fish for the purpose of the removal of the backbone.

With these and other objects in view, as will appear hereinafter, I have devised a machine for removing the backbones of fish, having certain novel features of construction, combination, and arrangement of parts and portions, as will be hereinafter described, and particularly set forth in the appended claims, reference being had to the accompanying drawings, and to the characters of reference thereon, which form a part of this application, in which:

Fig. 1 is a side elevation of my machine for removing the backbones of fish, the machine being shown diagrammatically and also fragmentarily;

Fig. 2 is an end elevation thereof;

Fig. 3 is a longitudinal sectional view thereof, taken through line 3—3 of Fig. 1; and, Figs. 4 and 5 are fragmentary sectional views taken through lines 4—4 and 5—5 of Fig. 1.

My fish machine, as generally described above, consists essentially of a conveyor A, for conveying or feeding fish longitudinally, and a cutting means B, in association with the conveyor, for cutting the fish longitudinally at the immediately opposite sides of the backbone, and completely through the fish, whereby the outer or edible sides of the fish may be readily separated from the backbone portion.

The conveyor A consists of a pair of axially spaced apart carrier discs 1 which are mounted on an arbor 2, this arbor being rotatably mounted in journals 3 carried on the frame 4. The discs may either be separately adjustably mounted on the arbor, or, as shown in the drawings, they may be held or spaced apart at their axial portions by spacers 5, and the discs, together with the spacers therebetween, are secured against axial movement to and on the arbor by nuts 6 at the outer sides of the discs.

The fish, designated C, may be placed, by any suitable means, between the peripheral portions of the discs with their backs downward or innermost, and with their head portions, from which the heads have been removed, foremost with respect to the direction of movement or the rotation of the discs. The peripheral portions of the discs are flared outwardly, as indicated at 1ª, so that the peripheral portions diverge with respect to each other from the inner portions of the discs. By reason of such flared portions the placing of the fish in the manner stated is facilitated.

The discs are also slightly flexible or resilient so that the fish may be yieldably held between the opposed discs, particularly for slightly varying sizes of fish.

The cutting means B consists of a pair of axially spaced apart cutter members in the form of discs 11. These are also mounted on an arbor 12. They may also be separated by spacers 13 between the cutting discs, and the cutting discs may be secured to the arbor 12 by nuts 14, located at the outer sides of the cutting discs.

The arbor 12 is mounted on journals 15 which are also carried by the frame 4.

The cutting edges of the discs 11 extend into the channel or space between the carrier or conveyor discs 1 and are so arranged that they make continuous incisions from the head of the fish to the tail end at the immediately opposite sides of the backbone, as the conveyor A carries the fish into the cutting discs.

On the frame is carried a conveyor 21 for collecting and carrying away the parts of the cut fish. This conveyor 21 is located immediately below the carrier or conveyor A, and it may be directed upwardly toward the discharge end, as shown.

The fish, from which the bones are to be removed, have tail portions which are thinner or narrower than the main back portions, and when the fish are held by the conveyor or carrier A, or between the two discs 1, these tail portions are not gripped and held rigidly at the opposite sides by the opposed discs of the conveyor or carrier, and consequently these tail portions are permitted to move laterally to a considerable and varying extent. Such freedom to move laterally, that is, the lateral play of the tail portions, does not permit of uniform cutting of the fish at the immediate opposite sides of the backbone at such tail portions, but allows the cutters 11 to cut into or cut off a portion of the back bone at the tail portions. I have therefore provided a tail centralizing means which is supported at the upper portion of the discs 1 of the conveyor or carrier and immediately in front of the cutters 11. Such centralizing means, as shown in the drawings, is supported on a bracket 26 mounted on the frame 4. This bracket, as shown, comprises separate bracket members which extend upwardly from the frame and are positioned at the opposite sides of the discs 1. At the upper end of the bracket 26 is pivotally mounted one end of the centralizing member 27. This member is of inverted U-shaped cross-section, as shown best in Fig. 4. The free end of the member 27 consists merely of opposed plate portions or vanes 27ª, as shown in Fig. 5, and these plate portions extend into the peripheral portion of carrier A or between the discs 1 thereof, in the path of the advancing fish. These free plate portions are also slightly resilient in order to yield slightly to the different widths of fish, but they are normally spaced apart a distance equal to the approximate thickness of the tail portions of the fish. The upper portions of the plate portions are also inclined slightly toward each other, as shown in Fig. 5, in order to conform to some extent with the belly portions of the fish.

The upper portion of the bracket 26 is provided with an arm 28 through the end of which slidably extends an arcuate guide rod or bolt 29 which is pivotally connected at its lower end to the free end portion of the centralizing member 27. The member 27 is held in its low position by a nut 29ª provided at the upper or free end of the bolt. Around the bolt 29 is positioned a compression spring 30. This spring normally forces the free end of the centralizing member 27 into the peripheral portion of the carrier or conveyor A.

As the fish are carried by the carrier or conveyor A toward the cutters 11, with their head portions foremost, the free end of the centralizing member 27 may be easily raised against the compression of the spring 30, but as the fish are carried toward the cutters 11, the free end of the centralizing member 27 will be forced downwardly by slight force of the compression spring 30, straddling the tail portion, and centralizing the same between the carrier discs 1 and causing the cutters 11 to cut the fish at the immediate opposite sides of the backbone.

For different widths and thicknesses of fish, the free end of the centralizing member 27 may be adjusted by means of the nut 29ª.

In order to prevent the fish, which may have been cut as described, from passing continuously around with the conveyor A, or to prevent clogging of the space between the discs 1, I have provided a deflector 31, which may also be supported on the frame 4. One end 31ª of the deflector extends toward the hub or axial portion of the carrier discs 1 and the other end 31ᵇ extends from between the carrier discs toward and adjacent to the belt conveyor 21. The portion of the deflector 31 between the carrier discs 1 extends at an acute angle with respect to the direction of movement of the carrier discs, thereby tending to eject the fish, or portions thereof, from between the carrier discs and direct the same towards the conveyor 21.

In association with the cutting means B is another deflector 41, one end of which is positioned between the cutting discs and the other end of which extends towards the conveyor 21. The latter deflector facilitates the ejection of backbone portions which may be wedged between the cutting discs.

The spacers 5 between the carrier discs 1 permit the lateral adjustment or spacing of the latter to accommodate the fish of considerably different sizes. The spacers 13 between the cutting discs also permit the axial adjustment of the cutting discs relative to each other to accommodate various thicknesses of the backbone.

In the drawings, I have shown a belt 51 for rotating the arbor 12. (The cutters, of course, may be driven directly by a motor, if desired.) The arbor 12 is shown as connected by a suitable gearing to the arbor 2 for rotating the latter at a considerably slower speed than the cutter arbor.

As shown, the arbor 12 has a worm 52 which meshes with and drives a worm gear 53. This gear is connected by a shaft 54 to a worm 55 which meshes with and drives a worm gear 56, which is mounted on the arbor 2. No supports or housings are shown for the several worms and worm gears in order to facilitate the illustration.

The conveyor arbor 2 is also shown as connected by sprockets 58 and a chain 59 to one end of the conveyor 21.

At a side of the frame 4 may be provided a bin or hopper 61 for holding the beheaded fish from which they may be fed by the operator into the moving channel between the discs 1 of the conveyor A.

My method of removing the backbones consists in placing and securing beheaded fish on their backs and feeding the same, while in such position, between cutting means spaced apart a distance of approximately the thickness of the backbone of the fish, and thereby cutting the fish longitudinally into three parts, the center of which contains the backbone, which is separated from the other parts of the fish.

Though I have shown and described a particular construction, combination, and arrangement of parts and portions of my apparatus, and a particular method of separating the backbones of fish, I do not wish to be limited to the same, but desire to include in the scope of my invention the construction, combination, and arrangement of elements of my apparatus, substantially as set forth in the appended claims.

I claim:

1. In a means of the class described, a conveyor comprising a pair of axially spaced apart discs having their peripheral edges diverging outwardly with respect to each other from the middle portion of the discs, said discs being adapted to receive therebetween and to hold fish on their backs, a cutting means comprising a pair of cutting members extending with their cutting edges between and spaced from said discs, and a deflector positioned between said discs and directed at an acute angle with respect to the direction of movement of the conveyor to facilitate ejection of fish therefrom.

2. In a machine of the class described, a conveyor having opposed walls for receiving and holding therebetween fish on their backs, a cutting means having spaced apart cutting members extending with their cutting edges into said conveyor and spaced inwardly from the walls thereof, a second conveyor positioned below the first conveyor and extending in the direction of the movement of the upper portion of the latter, a deflector extending from the first conveyor toward the second conveyor, and another deflector extending from between the cutting members toward the second conveyor.

3. In a machine of the class described, a conveyor comprising a pair of axially spaced apart resilient discs flared outwardly with respect to each other in their peripheral portions, said discs being inherently flexible and adapted yieldably to hold fish therebetween, and a cutting means extending between the discs for cutting the fish longitudinally.

4. In a machine of the class described, a conveyor having opposed walls for receiving and holding therebetween fish on their backs, a cutting means having spaced apart cutting members extending with their cutting edges into said conveyor and spaced inwardly from the walls thereof, and a fish centralizing means movably mounted above the conveyor and adapted to straddle the fish therein and centrally locate the tail portions of the fish between the opposite walls of the conveyor, the following end of the centralizing means having spaced apart resilient plate portions for engaging the opposite sides of the fish.

5. In a machine of the class described, a conveyor having opposed walls for receiving and holding therebetween fish on their backs, a cutting means having spaced apart cutting members extending with their cutting edges into said conveyor and spaced inwardly from the walls thereof, a fish centralizing means pivotally mounted at one end above the conveyor, the free end of the centralizing means being adapted to ride upon and straddle the fish therein and centrally locate the tail portions of the fish between the opposite walls of the conveyor, the free end of the centralizing means having spaced apart resilient plate portions for engaging the opposite sides of the fish, and a spring for forcing the free end of said means toward the conveyor and over the fish.

ANDREW L. CHRISTIANSEN.

REFERENCES CITED

The following references are of record in the file of this patent:

UNITED STATES PATENTS

| Number | Name | Date |
| --- | --- | --- |
| 462,903 | Kane | Nov. 10, 1891 |
| 753,722 | Manula et al. | Mar. 1, 1904 |
| 1,134,529 | Hauber | Apr. 6, 1915 |
| 1,134,530 | Hauber | Apr. 6, 1915 |
| 1,331,932 | Kloster | Feb. 24, 1920 |
| 1,552,463 | Barry | Sept. 8, 1925 |
| 1,883,822 | Reid et al. | Oct. 18, 1932 |
| 2,140,575 | David et al. | Dec. 20, 1938 |
| 2,210,234 | Durand | Aug. 6, 1940 |
| 2,311,176 | Hutton | Feb. 16, 1943 |
| 2,321,086 | Hutton | June 8, 1943 |